(12) United States Patent
Sridhar et al.

(10) Patent No.: US 12,356,248 B2
(45) Date of Patent: Jul. 8, 2025

(54) SYSTEM AND METHOD FOR DELIVERING QUALITY OF SERVICE

(71) Applicant: Sandvine Corporation, Waterloo (CA)

(72) Inventors: Kamakshi Sridhar, Plano, TX (US); Manuel Jesus Rebellon Tascon, Waterloo (CA)

( * ) Notice: Subject to any disclaimer, the term of this patent is extended or adjusted under 35 U.S.C. 154(b) by 385 days.

(21) Appl. No.: 17/885,877

(22) Filed: Aug. 11, 2022

(65) Prior Publication Data

US 2023/0047537 A1 Feb. 16, 2023

Related U.S. Application Data

(60) Provisional application No. 63/231,882, filed on Aug. 11, 2021.

(51) Int. Cl.
*H04W 28/08* (2023.01)
*H04W 28/02* (2009.01)
*H04W 4/40* (2018.01)

(52) U.S. Cl.
CPC ... *H04W 28/0942* (2020.05); *H04W 28/0226* (2013.01); *H04W 28/0268* (2013.01); *H04W 28/0967* (2020.05); *H04W 4/40* (2018.02)

(58) Field of Classification Search
CPC ......... H04W 28/0942; H04W 28/0226; H04W 28/0268; H04W 28/0967; H04W 4/40; H04W 4/025; H04W 24/02; H04L 41/0894; H04L 41/5009; H04L 43/0864; H04L 43/0888; H04L 41/14; H04L 41/147; H04L 41/5019; H04L 41/5067
USPC ....................................................... 370/235
See application file for complete search history.

(56) References Cited

U.S. PATENT DOCUMENTS

2016/0234078 A1* 8/2016 Jana ........................ H04L 47/25
2019/0319868 A1* 10/2019 Svennebring ....... H04L 43/0882
2021/0092584 A1* 3/2021 Zou ........................ H04W 4/029
2024/0163741 A1* 5/2024 Filin ............... H04W 36/00833

FOREIGN PATENT DOCUMENTS

EP 2530870 B1 9/2015

OTHER PUBLICATIONS

European Search Report, European Patent Office, on corresponding EP Application No. 22190047.5, dated Dec. 22, 2022.

* cited by examiner

*Primary Examiner* — Kwang B Yao
*Assistant Examiner* — Syed M Bokhari
(74) *Attorney, Agent, or Firm* — Amarok IP Inc.; Neil W. Henderson (57) ABSTRACT

A method for delivering quality of service to a moving user equipment in a computer network, the method including: identifying a moving user equipment on the computer network; predicting a path of travel for the user equipment; determining a load of a cell in the path of travel; determining a traffic action response based on the load of the cell; and providing the traffic action. A system for delivering quality of service to a moving user equipment in a computer network, the system including: a location module configured to identify a moving user equipment on the computer network; an analysis module configured to predict a path of travel for the user equipment; a load module configured to determine a load of a cell in the path of travel; and a traffic action module configured to determine a traffic action response based on the load of the cell and provide for the traffic action.

16 Claims, 11 Drawing Sheets

SYSTEM AND METHOD FOR DELIVERING QUALITY OF SERVICE

RELATED APPLICATIONS

The present disclosure claims priority to U.S. Provisional Patent Application No. 63/231,882 filed Aug. 11, 2021 which is hereby incorporated in it's entirety herein.

FIELD

The present disclosure relates generally to computer network traffic. More particularly, the present disclosure relates to a system and method delivering quality of service to a vehicle over a computer network.

BACKGROUND

Network traffic continues to increase all over the world. As network traffic increases, service providers continue to upgrade their network equipment to better serve their subscribers. Once such network upgrade has been to begin implementing fifth generation (5G) networks within an area served by the service provider.

5G networks are configured to greatly increase the speed and efficiency of wireless networks. 5G networks are intended to include a large number of small cell stations as compared to 4G networks, which are served by high power cell towers that radiate over long distances. As a user equipment moves from one cell to another, a Handover occurs from a source cell to a neighboring cell.

As various types of user equipment may connect to and transfer from one to another cell tower, it is desirable to provide congestion management and quality of service based on the various user equipment types.

It is, therefore, desirable to provide an improved method and system for quality of service and, in particular, quality of service in a 5G network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for delivering quality of service to a moving user equipment in a computer network, the method including: identifying a moving user equipment on the computer network; predicting a path of travel for the user equipment; determining a load of a cell in the path of travel; determining a traffic action response based on the load of the cell; and providing the traffic action.

In some cases, the method may include: determining a change in the path of travel for the user equipment; determining a new cell and a load of the new cell in the changed path of travel; and providing updated traffic actions based on the load of the new cell.

In some cases, the user equipment may be a user equipment within a vehicle or a drone.

In some cases, determining the load of the cell may include determining a congestion level of the cell.

In some cases, the traffic action may include shaping background or low priority traffic.

In some cases, determining the load of the cell in the path of traffic may include: determining a quality of experience measurement, for the user equipment for the cell; determining if the quality of experience measurement is above a predetermined quality score; and if the score is above the predetermined quality score allowing the traffic to flow from the cell unmodified.

In some cases, the method may further include: determining a plurality of subsequent cells in the path of travel; determining a load of each of the subsequent cells in the path of travel; determining a quality of experience measurement for each of the cells based on the load of each cell; determining if the quality of experience measurement is above a predetermined quality score; and providing traffic actions to any of the subsequent cells wherein the quality score is below the predetermined quality score.

In some cases, the plurality of subsequent cells may include 1 to 3 cells further along the path of travel.

In some cases, predicting the path of travel may include receiving predictions or statistics related to the user equipment mobility from the network data analytics function.

In another aspect, there is provided a system for delivering quality of service to a moving user equipment in a computer network, the system including: a location module configured to identify a moving user equipment on the computer network; an analysis module configured to predict a path of travel for the user equipment; a load module configured to determine a load of a cell in the path of travel; and a traffic action module configured to determine a traffic action response based on the load of the cell and provide for the traffic action.

In some cases, the analysis module may be configured to determine a change in the path of travel for the user equipment and a new cell in the changed path of travel; the load module is configured to determine a load of the new cell in the changed path of travel; and the traffic action module is configured to provide updated traffic actions based on the load of the new cell.

In some cases, the user equipment may be a user equipment within a vehicle or a drone.

In some cases, the load module may be configured to determine the load of the cell by determining a congestion level of the cell.

In some cases, the traffic action module may provide for shaping background or low priority traffic as the traffic action.

In some cases, the load module may be configured to: determine a quality of experience measurement for the user equipment for the cell; determine if the quality of experience measurement is above a predetermined quality score; and if the score is above the predetermined quality score the traffic action module may allow the traffic to flow from the cell unmodified.

In some cases, the analysis module may be configured to determine a plurality of subsequent cells in the path of travel; the load module may be configured to determine a load of each of the subsequent cells in the path of travel, determine a quality of experience measurement for each of the cells based on the load of each cell and determine if the quality of experience measurement is above a predetermined quality score; and the traffic action module may be configured to provide traffic actions to any of the subsequent cells wherein the quality score is below the predetermined quality score.

In some cases, the plurality of subsequent cells may be between 1 to 3 cells further along the path of travel.

In some cases, the location module may be configured to predict the path of travel comprises receiving predictions or statistics related to the user equipment mobility from the network data analytics function.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for delivering quality of service in a 5G network or potentially the next generation such as a 6G network. In particular, embodiments of the system and method are configured to determine a type of user equipment and identify user equipment that may require faster handovers than others, for example, a vehicle or drone or other faster moving user equipment (generally referred to herein as vehicle). Embodiments of the system and method are further configured to determine a path of travel of the vehicle and determine congestion levels of a plurality of cells within the path of travel. Embodiments of the system and method are configured to provide congestion management for those cells to prioritize the moving vehicle to provide an acceptable quality of service (QoS) to the vehicle.

Figure 1:
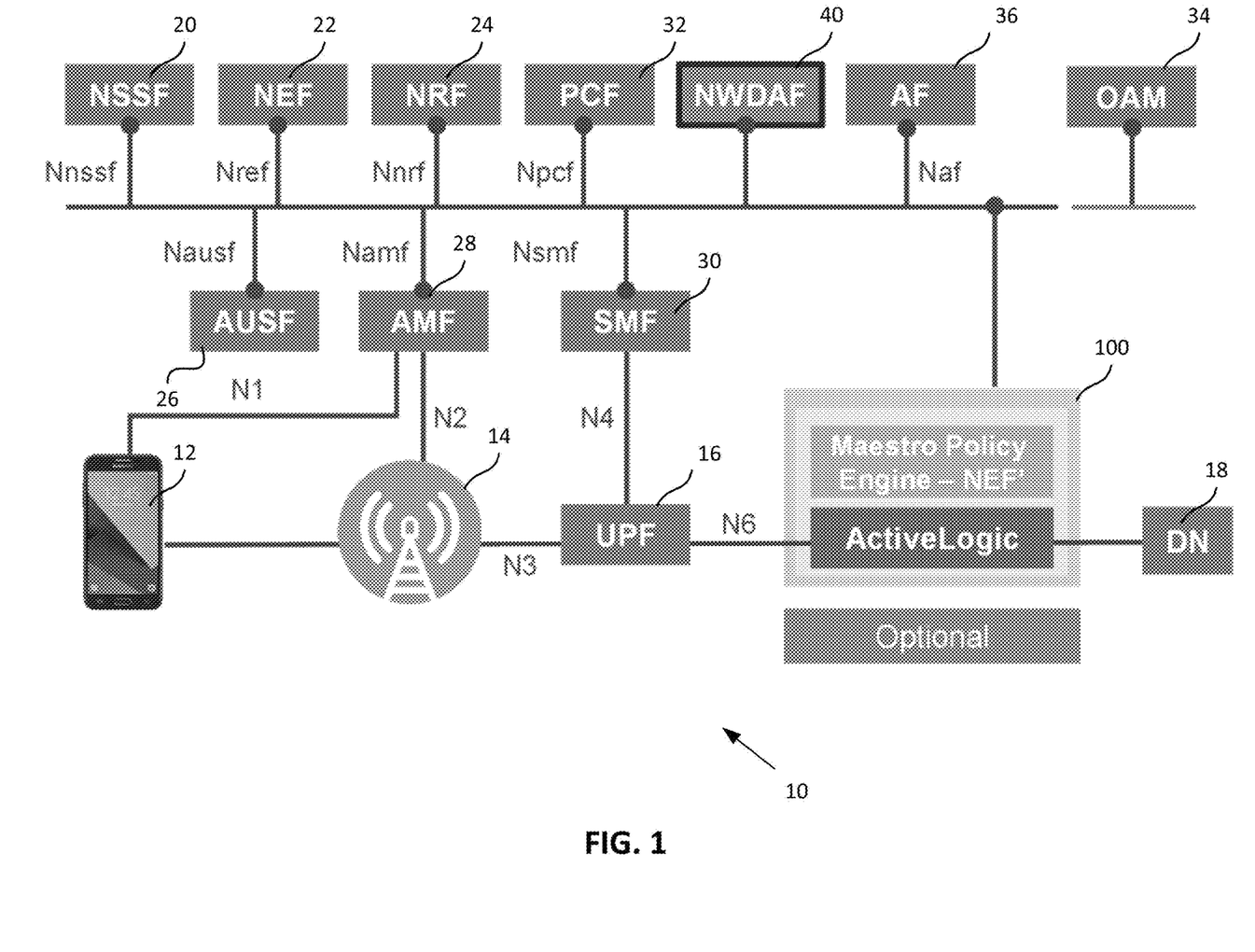
FIG. 1 illustrates a 5G computer network environment.

Computer networks, including 5G networks, generally aim to support a subscriber's desire to deliver a rich variety of high throughput (eMBB), highly reliable (URLLC), and low latency services. FIG. 1 shows a 5G Service Based Architecture of a computer network 10. Subscribers, via user equipment 12, such as vehicles, drones, mobile phones, tablets and the like, often connect to a Radio Access Network (RAN) 14. The RAN is connected to a User Plane Function (UPF) 16 which then connects to the Data Network (DN) 18. It, will be understood that a 5G network may further include at least one Network Slice Selection Function (NSSF) 20, a Network Exposure Function (NEF) 22, a Network Repository Function (NRF) 24, Authentication Server Function (AUSF) 26, Access and Mobility Management Function (AMF) 28, Sessions Management Function (SMF) 30, Policy and Control Function (PCF) 32, Operations, administration, and management (OAM) 34, and Application Function (AF) 36.

Further, a Network Data Analytics function (NWDAF) 40 is configured to provide analytics network function in 5G, which was introduced for the first time as a 3GPP standards entity. The NWDAF 40 entity is configured to process network information to provide real-time analyzed outputs to 5G network functions for NF selection, QoS assignment, and the like. In some cases, the NWDAF analytics ID outcomes are consumed by other NF's: PCF, SMF, NSSF and the like, so that it will take appropriate actions to enable various use cases. The NWDAF 40 may collect network information (for example, load, user statistics, and the like) and OAM data (gNB statistics such as downlink and uplink throughput in bytes, lost packets, and the like) from 5G NFs.

The NWDAF may further receive real-time application and Quality of Experience (QoE) data from the system 100, as detailed herein, for more accurate outcomes. Embodiments of the system and method are intended to receive or retrieve the analytics from the NWDAF with further application and QoE data to provide for faster network responsiveness. In some cases, lower Operating Expenditure (OPEX) may be achieved via minimal manual fine-tuning is needed for optimal allocation of 5G resources.

Embodiments of the system and method detailed herein are intended to be used for communicating vehicles to other entity (V2X) or drone to other entity (D2X). In this disclosure vehicle is used to refer to drones as well as more traditional vehicles.

Embodiments of the system and method are intended to provide reliable communication to provide stable service to the vehicle. V2X is a service that requires this kind of reliable communication. Embodiments of the system and method are intended to be able to be used for communication that requires high reliability and very low latency with high mobility. As noted previously, a specific example may include the connectivity for Drones as the control of the drone is performed from a central point using 5G networks. Other autonomous systems may also benefit from the embodiments of the system and method detailed herein.

Figure 2:
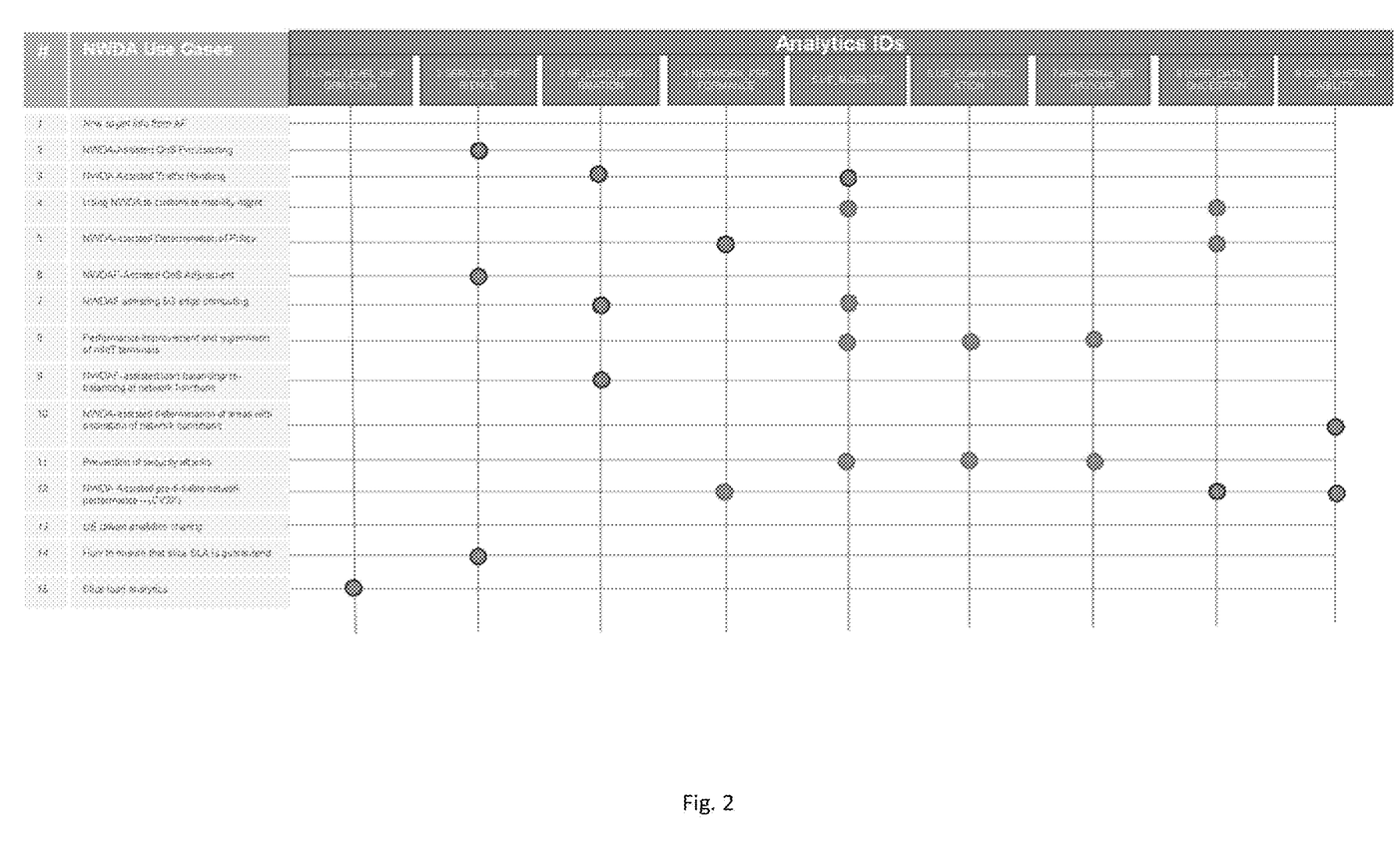
FIG. 2 is a chart illustrating various analytic IDs and the associated use cases according to an example.

Embodiment of the system and method are intended to implement the reliability of the communication to V2X using components of the 5G core, including for example the NWDAF, which is configured to determine Analytics Id referred to as QoS sustainability. FIG. 2 illustrates various analytics that may be used by the system and by 5G networks in general.

Figure 3:
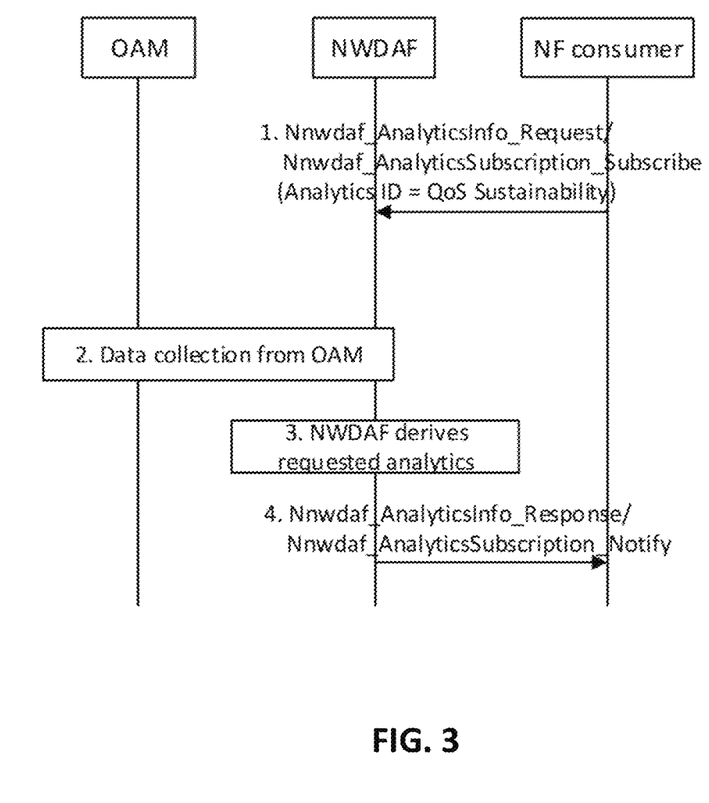
FIG. 3 illustrates a sequence diagram for information flow in a 5G computer network.

FIG. 3 illustrates a sequence diagram with respect to determining the QoS sustainability analytics according to a conventional method. It will be understood that a Network Function (NF) consumer, which is registered with the 5G network, may request to subscribe to various analytics determined by the NWDAF 40. The NWDAF may receive data collected from the OAM 34 and derives the analytics from this data. The NWDAF 40 may then deliver the requested analytics to the NF consumer.

Conventional solutions using this type of analytics have generally been unable to provide sufficiently sustained QoS to moving vehicles and/or drones. In particular, it is noted that the Analytics ID serves only to monitor the QoS sustainability availability. Conventional solutions to not tend to provide actions or alternatives to fix the problem when the QoS cannot be sustained.

Figure 4:
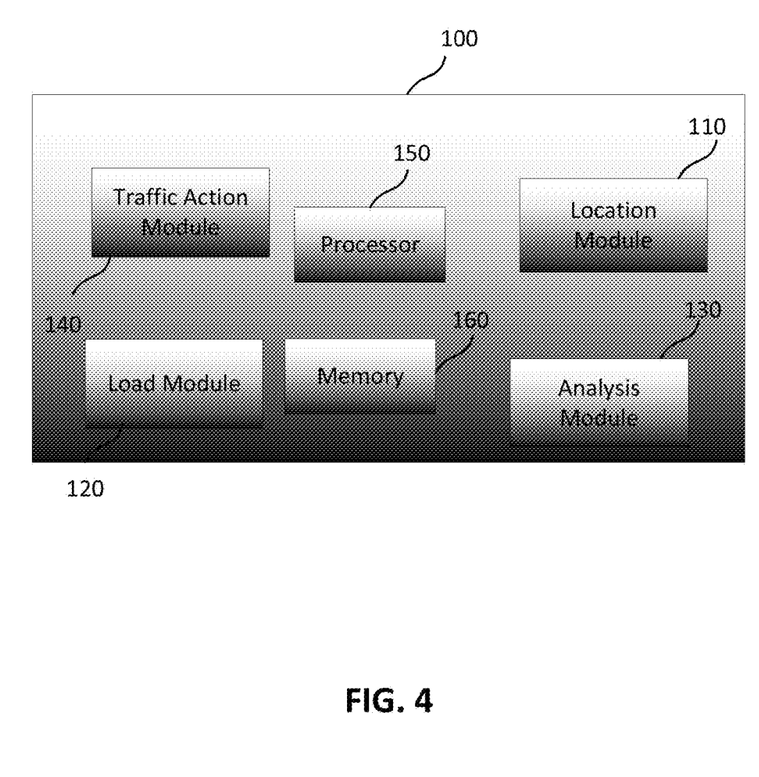
FIG. 4 illustrates a system for delivering quality of service according to an embodiment.

FIG. 4 illustrates an embodiment of a system 100 for delivering Quality of Service (QoS). The system includes a location module 110, an load module 120, an analysis module 130, a traffic action module 140, at least one processor 120 and at least one memory component 125. In some cases, the system may further include a correlation module 130. The system is generally intended to reside on the core network but may be distributed. The modules, including the processor 120 and memory 125, are in communication with each other but may be distributed over various network devices or may be housed within a single network device. The processor may be configured to execute the instructions stored in the memory component in order for the modules to execute their functions. The system 100 is intended to receive information from the computer network equipment that allows the system to determine traffic flow information, including application type, user equipment type, cell ids, congestion data and the like.

The location module 110 is configured to determine the location of a vehicle or drone or other quick moving user equipment that may be flagged as a user equipment that would benefit from high quality of service. It will be understood that, for example, a drone or self driving vehicle requires quick and reliable service with low latency in order to perform various tasks. The location module 110 is configured to determine the location of this type of user equipment when the vehicle enters the network and starts a session.

The load module 120 is configured to determine a load or congestion level of cells near or in a path of the vehicle. The load module 120 may be configured to query or retrieve data from network devices that will provide data with respect to the load of various cells near or within the path of the vehicle. The path of the vehicle is determined by learning the number of cell transitions that the vehicle (or the User Equipment residing in the vehicle) makes in a predetermined time interval. The observation of past behavior is intended to help inform the likely path that the vehicle is going to take. These observations are intended to be made frequently. If the vehicle turns or goes off course, the system/method will use the most recent measurements to recalculate or redetermine the new trajectory. The updated trajectory may then be used for future travel path planning.

The analysis module 130 is configured to analyze the load of the various cells in conjunction with the vehicle location to determine what if any traffic action may be required to provide an appropriate Quality of Service to the vehicle. The analysis module 130 may further determine or retrieve past cell trends or other cell metrics in order to further determine appropriate actions to deliver the level of quality of service to the vehicle. The analysis module 130 may determine whether certain traffic may be shaped or other traffic action may be appropriate in order to deliver the quality of service to the vehicle.

Figure 5:
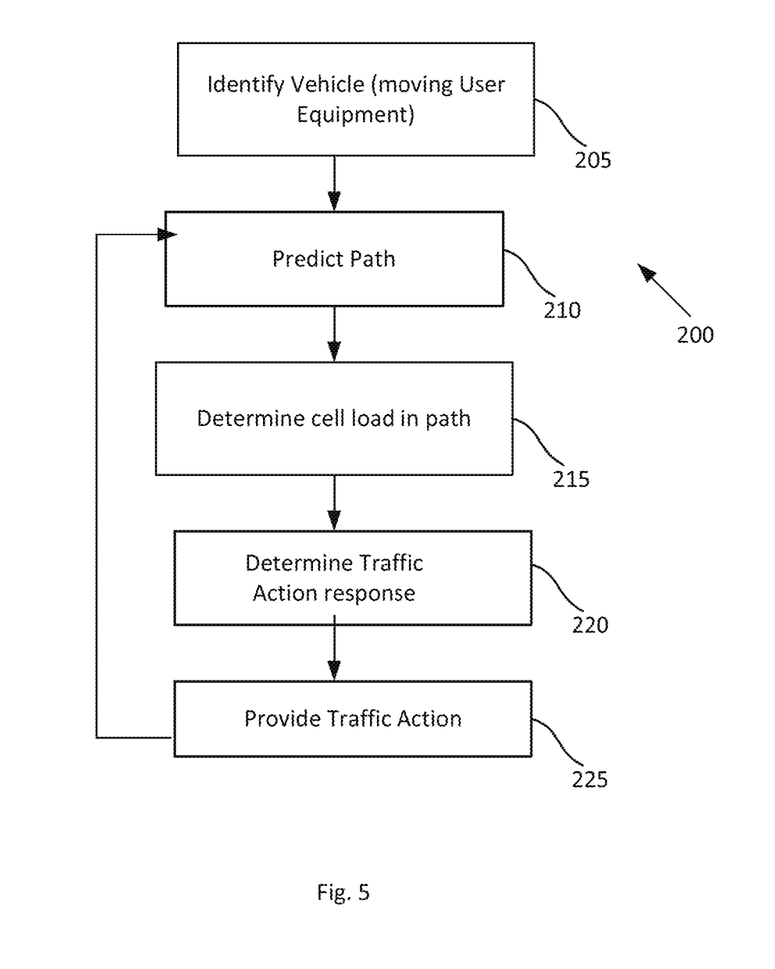
FIG. 5 illustrates a method for delivering quality of service according to an embodiment.

The traffic action module 140 is configured to provide for the traffic action. In some cases, the traffic action module 140 may be at least one shaper or operatively connected to at least one shaper in order to implement traffic prioritization to at least one cell. In other cases, packets may be marked through DSCP marking. DSCP marking allows downstream nodes to appropriately prioritize the traffic FIG. 5 is a flow chart illustrating a high-level method 200 for delivering QoS. The location module 110 may determine a session in the network with a vehicle, at 205. It will be understood that the vehicle may be a moving user equipment within a vehicle, a drone, or the like. At 210, the location module 110 may further predict the path of the vehicle. At 215, the load module 120 is configured to determine the load or congestion level of the cells within the path of the vehicle. At 220, the analysis module 130 may determine whether a traffic action response may be beneficial in order to provide the adequate Quality of Service to the vehicle in any of the cells within the identified path. At 225, the traffic action module may provide for the traffic action. The system is configured to continue monitoring the vehicle and if there is a change from the predetermined estimated path, the system may update the predict path and determine the cell load or congestion level at any new cell in the updated path.

Figure 6:
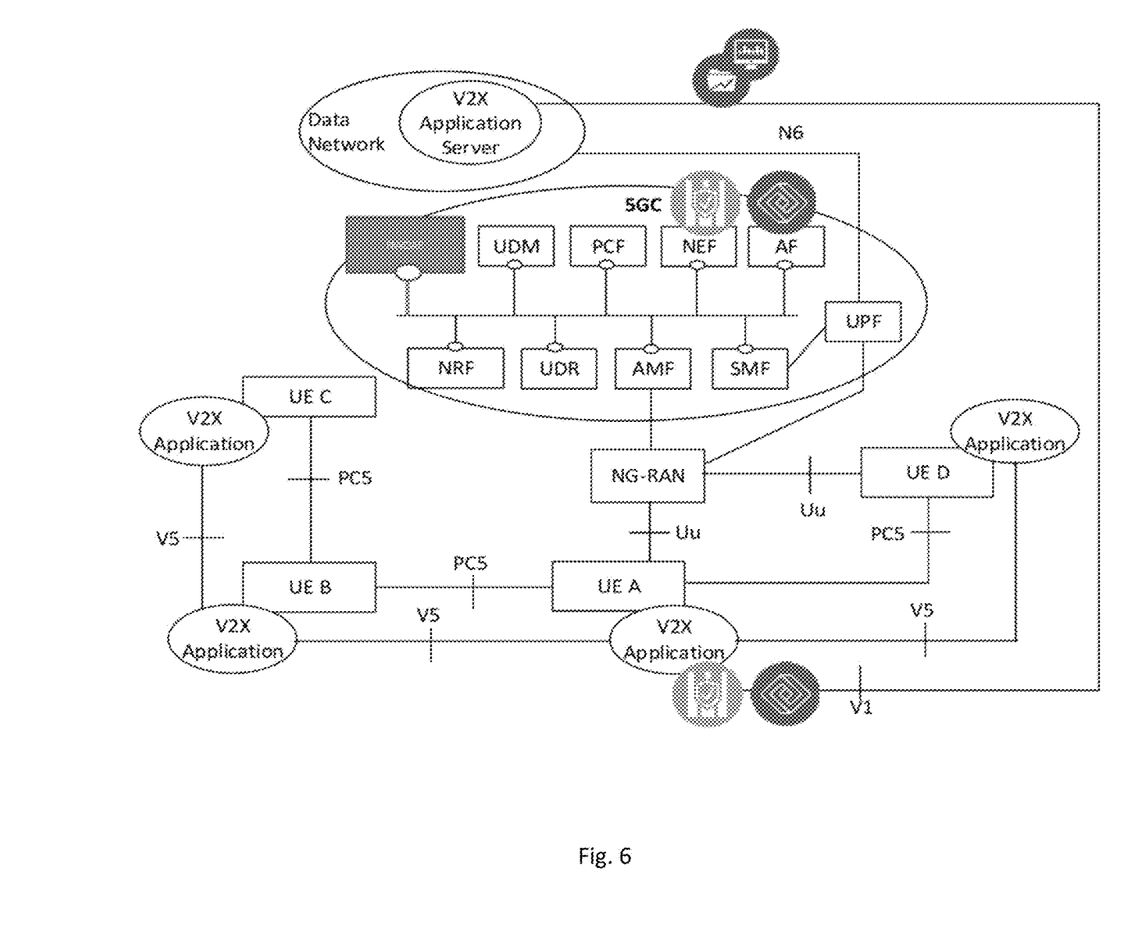
FIG. 6 illustrates an example of various user equipment accessing a 5G network according to an embodiment.

FIG. 6 illustrates an example of a plurality of vehicles accessing a 5G network. It will be understood that the system and methods detailed herein are intended to provide low latency services to each of the vehicles and perform analytic passed predictions based on the received traffic behavior to provide traffic actions to deliver the low latency services to the vehicles. Further, embodiments of the system and method at intended to provide for traffic decisions or traffic actions to increase or sustain a level of quality of service.

Figure 7A:
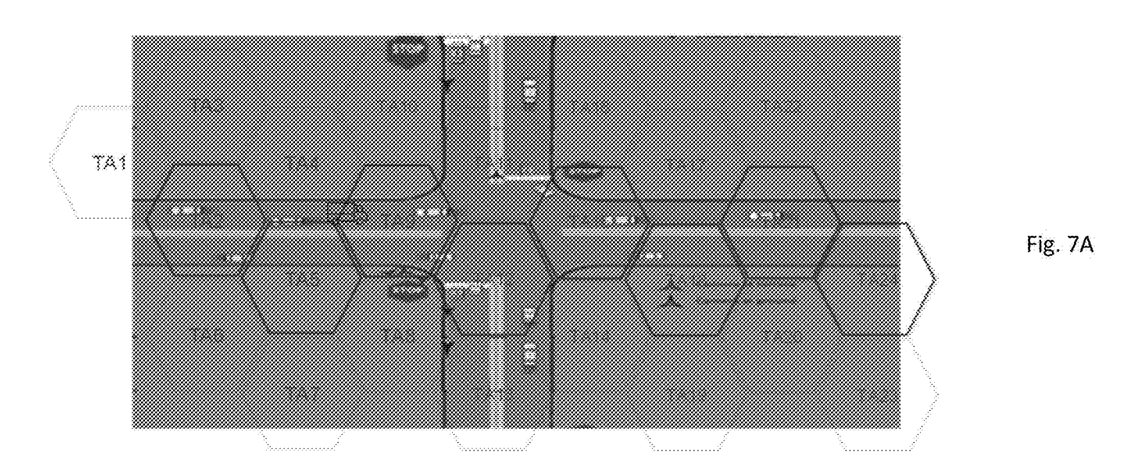
FIGS. 7A and 7B illustrate a vehicle path for a system for delivering quality of service according to an embodiment.
Figure 7B:
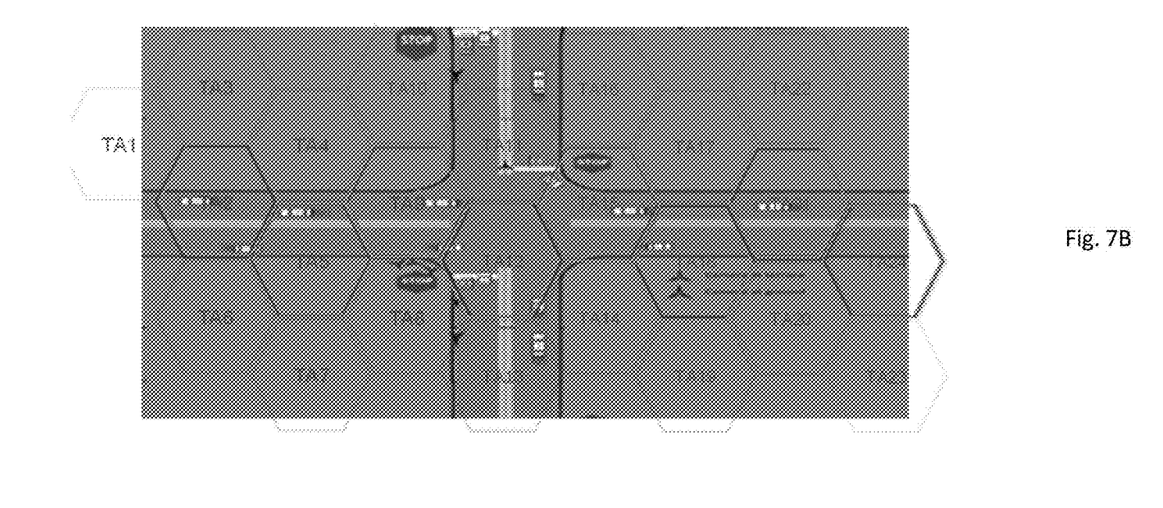

In a particular use case, as shown in FIGS. 7A and 7B, a self-driving vehicle, for example UE A, may enter the network or establish a session and request for sustained connectivity with their operation center/app server, with following Service level agreement (SLA): Throughput: 800 Mbps, symmetrical and Round trip Latency: 5 milliseconds. Embodiments of the system and method detailed herein are configured to prioritize vehicle's traffic, based on the Application's Id identified in that Tracking Area (TA). There is intended to be no or little impact on the traffic in the rest of TAs and once the vehicle exits a cell, reverts to normal traffic/priority management. As can be seen figure FIGS. 7A and 7B, the system and method may determine the path of the vehicle, for example a vehicle engaged in cooperative adaptive cruise control.

In conventional solutions, the SLA latency may not be optimally managed at the cell and, the SLA throughput may not be efficient or guaranteed at all times. In particular, in conventional solutions, the SLAs on latency and throughput are not generally enforced. because it can be time consuming and costly.

Embodiments of the method and system are intended to support low latency services. In particular, the analysis module may perform analytic predictions based on the recent traffic behavior. The analysis module may enforce the derived decisions to ensure quality service.

In particular, it will be understood that the NWDAF 140 is configured to collect Applications traffic metrics (per App Id) and generates cell usage prediction across a known mobility path. Having retrieved this metrics, the system is intended to enable QoS adjustments for non-essential traffic (per App Id). By providing for various traffic actions, the system is intended to provide QoS sustainability & low latency before the vehicle enters the cell. Once the vehicle exits a cell, the cell may revert to normal traffic/priority management. In particular, embodiments of the system and method are intended to have no or low impact on other traffic due to the momentary de-prioritization of background traffic done by or initiated by the traffic action module.

Figure 8:
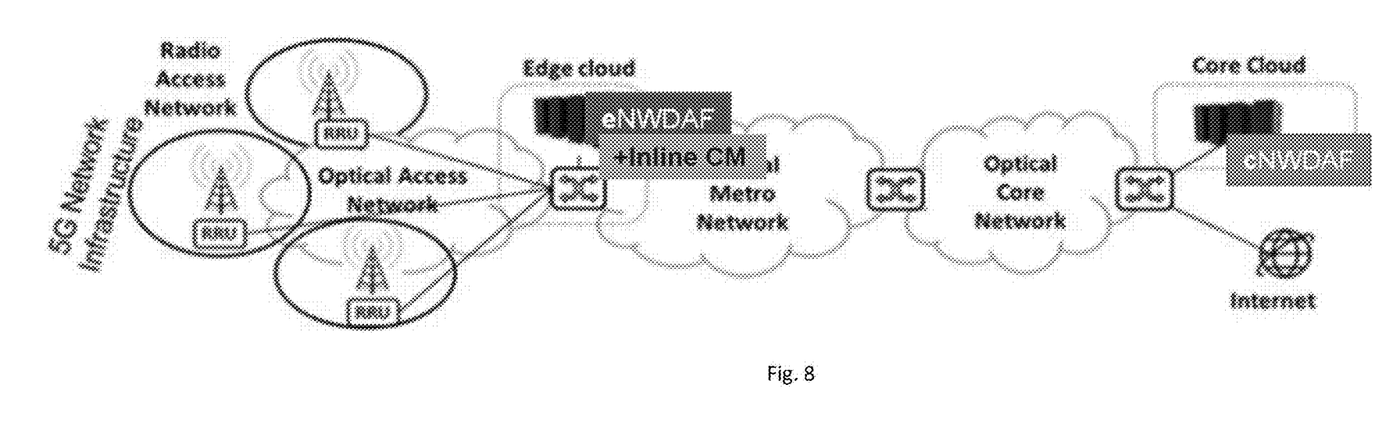
FIG. 8 illustrates a 5G network infrastructure according to an embodiment.

FIG. 8 illustrates an embodiment of lightweight NWDAF on the Edge to serve V2X applications. In this example, the system may reside in the Edge cloud and may use inline congestion management to help SLA for V2X applications. In particular, the traffic action module is configured to reduce by shaping or reprioritizing any background data on the radio cell before the User Equipment (UE) (and in this case a Vehicle) reaches the radio cell. This shaping is intended to provide for additional radio resources to serve the UE. This figure provides for another optional deployment option showing the Edge cloud and a Public cloud.

In some cases, the system and method are intended to use at least two standard analytic ids generated by the NWDAF. In particular, the location module may determine the UE mobility Analytics ID, which is intended to predict user equipment trajectory. Further, the load module may receive or retrieve the Quality of Service Sustainability Analytics ID which is intended to predict user QoS Key Performance Indicators (KPIs). These KPIS are communicated to the PCF (Policy Control Function) to change the 5G QI, or to the SMF (Session Management Function) to change the association of the UPF (user plane function) to the UE and the like.

Figure 9:
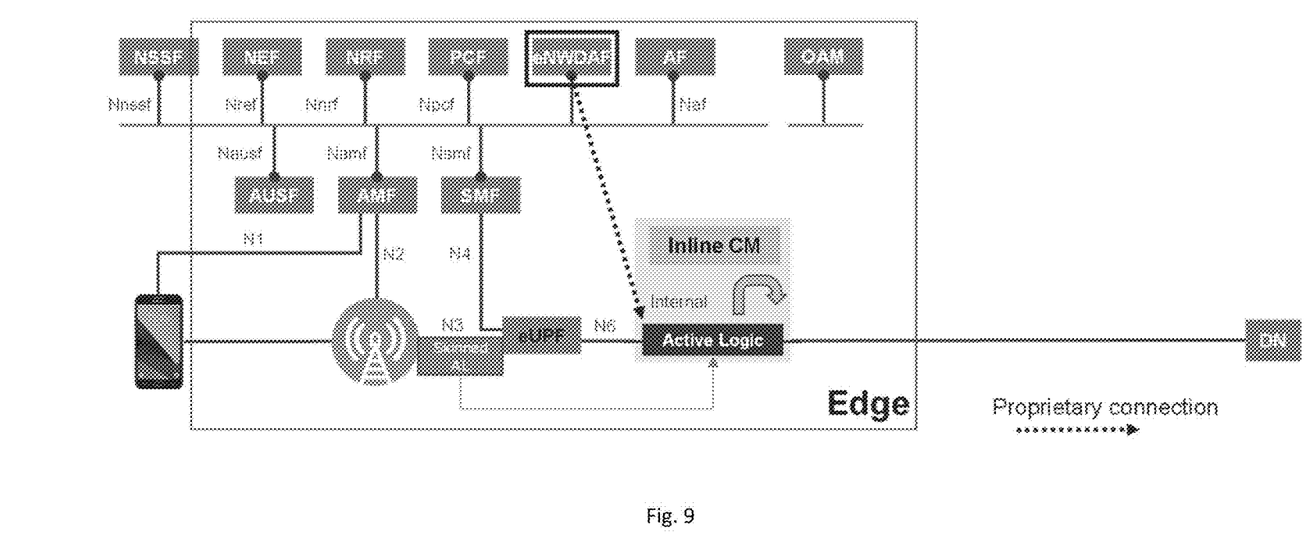
FIG. 9 illustrates a 5G computer network demonstrating information flow according to an embodiment.

FIG. 9 illustrates the 5G network with an additional communication path associated with an eNWDAF. If will be understood that an eNWDAF may be an NWDAF if less functionality or a particular functionality for the network.

Figure 10:
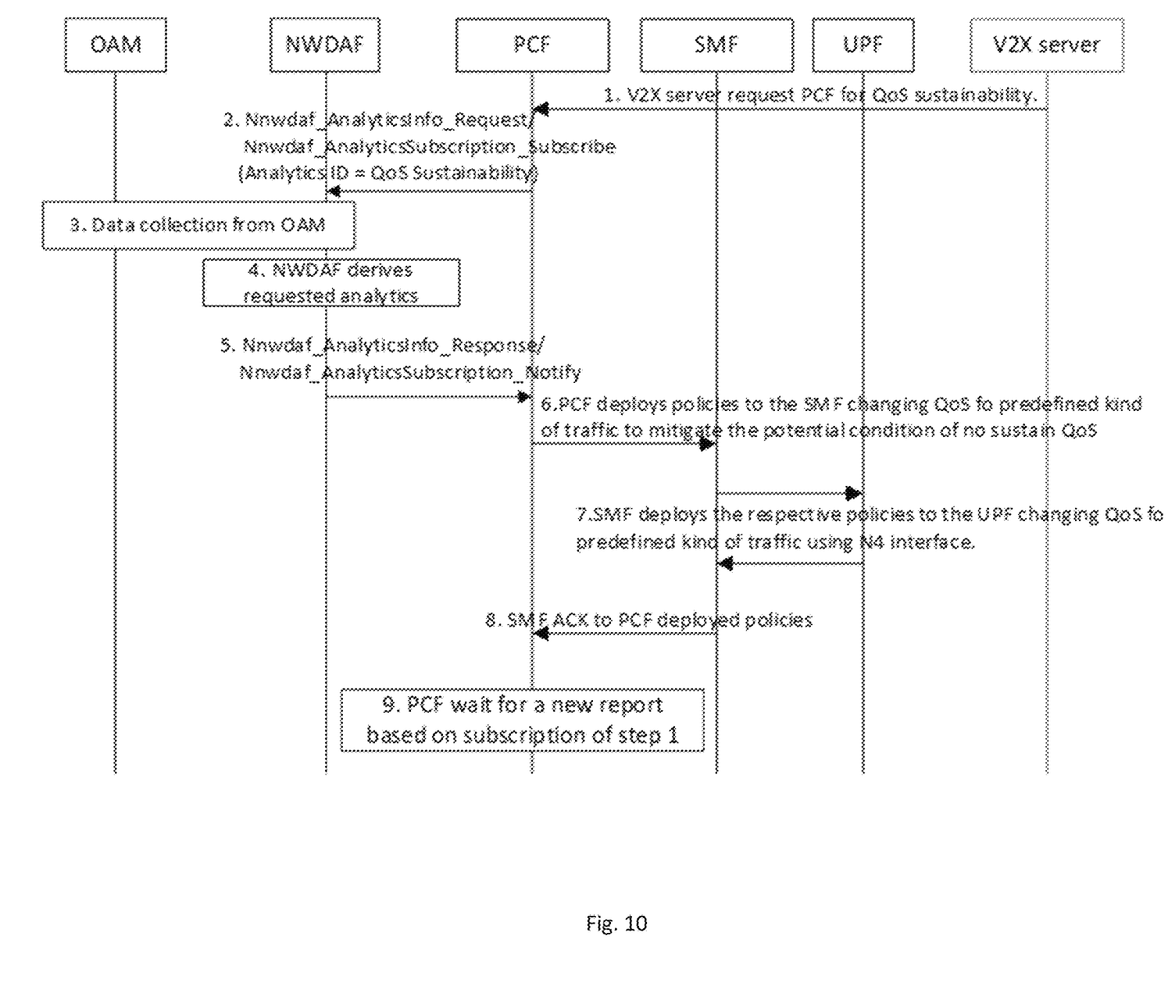
FIG. 10 illustrates a conventional method for determining service for a vehicle or drone.

Embodiments of the method and system are intended to provide for network performance actions to avoid or mitigate a potential condition when the QoS is not going to be sustainable. As shown in the examples using the system and method detailed herein, the NWDAF service consumer is the PCF and the V2X server is consumer of the PCF directly or via the NEE FIG. 10 illustrates a conventional procedure where QoS sustainability may not be achievable. In particular, a V2X server request PCF for QoS sustainability. The consumer requests or subscribes to analytics information on "QoS Sustainability" provided by NWDAF. The consumer may include multiple sets of parameters in order to provide different combinations of "Location information" and "Analytics target period" when requesting QoS Sustainability analytics.

The NWDAF collects the data specified from the OAM, following a generally known procedure. The NWDAF verifies whether any triggering conditions are met and derives the requested analytics. Examples of triggering condition include, for example significant changes (or a significant increase) in RAN throughput in short time intervals, sudden increase in UE (user equipment) in the RAN cell or the like. The NWDAF can detect the need for notification based on comparing the requested analytics of the target 5QI against a Reporting Threshold(s) provided by consumer in any cell over the requested Analytics target period.

In this conventional solution, the NWDAF is configured to provide a response or notification on "QoS Sustainability" to the consumer. In this case, in FIG. 10 the PCF may be the consumer. The PCF is configured to deploy policies to the SMF changing QoS for predefined kind of traffic to mitigate the potential condition of no sustain QoS. The SMF deploys the respective policies to the UPF changing QoS for predefined kind of traffic using N4 interface. The UPF is configured to acknowledge the policies deployment and the SMF acknowledges to the PCF policies deployment. At this point the PCF may stay waiting from the NWDAF a new report to know if the policies deployed were enough to mitigate the QoS sustainability issue.

Figure 11:
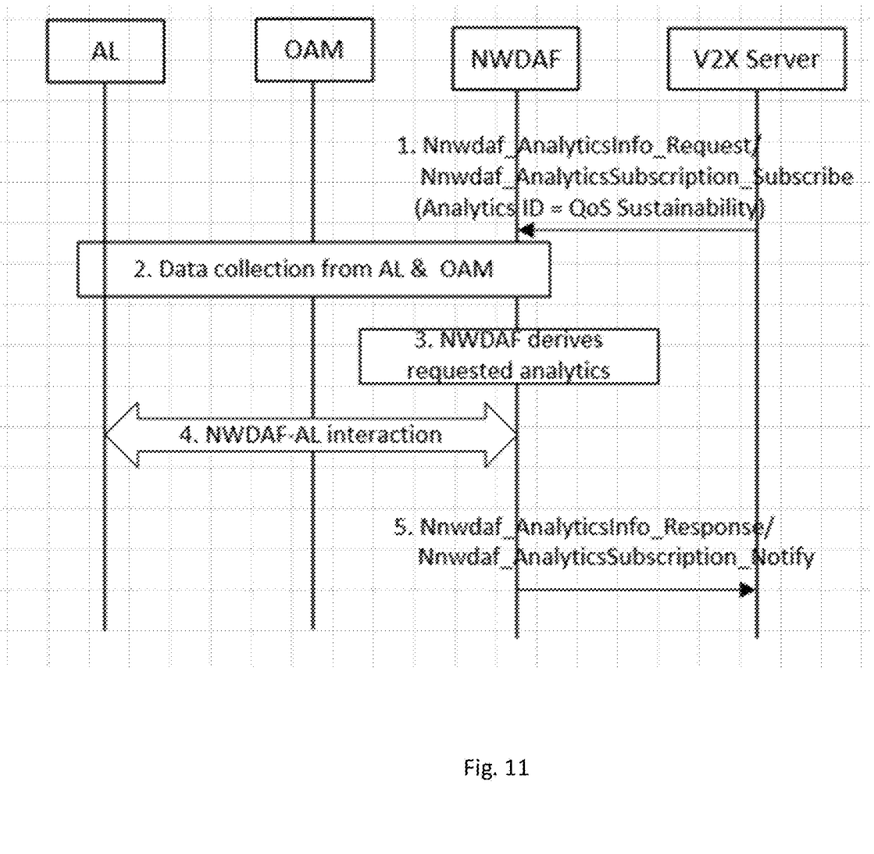
FIG. 11 illustrates a sequence diagram for delivering service according to an embodiment.

FIG. 11 illustrates a sequence diagram of the system and method presented herein. The method and system are intended to provide a quicker and more full response than conventional solutions and address some of the deficiencies of the conventional solutions. The system is intended to collect data from other network devices, for example, the OAM and NWDAF. From this collected data, the system is intended to review congestion levels and determine whether the QoS is likely to be sustainable within a cell. The system may request to receive a plurality of parameters in order to provide different combinations of "Location information" and "Analytics target period" when requesting QoS Sustainability analytics.

The NWDAF is configured to collect the requested data from the OAM. The system may also determine data or provide collected data to the NWDAF. The system collected data may include, for example, traffic KPIs. The system, and in particular the load module, is configured to collect these KPIs from the interface N6 of the UPF is attending the respective PDU session subject of this service.

The NWDAF may verify whether a triggering condition is met and then may derive the requested analytics. The NWDAF can detect the need for notification based on, for example, comparing the requested analytics of the target 5QI against the Reporting Threshold(s) provided by consumer in any cell over the requested Analytics target period. The reporting thresholds are determined by the operator based on observations and learnings in the network on traffic dynamics. The more dynamic the traffic is over short intervals, the higher the threshold. This is intended to preclude frequent requests from NWDAF that would incur computation costs.

Further, as shown in FIG. 11, NWDAF and the system are intended to interact to avoid or mitigate the potential situation of not sustain the QoS as detailed herein. The NWDAF is configured to provide a response or notification on "QoS Sustainability" to the consumer.

It will be understood that the system and method provided herein are intended to provide for the benefit of minimize the number of nodes that are used to communicate in order to determine QoS sustainability. With less nodes communicating, it is intended that the system and method may be quicker to react than conventional solutions, thus providing better QoS to the vehicle.

Figure 12:
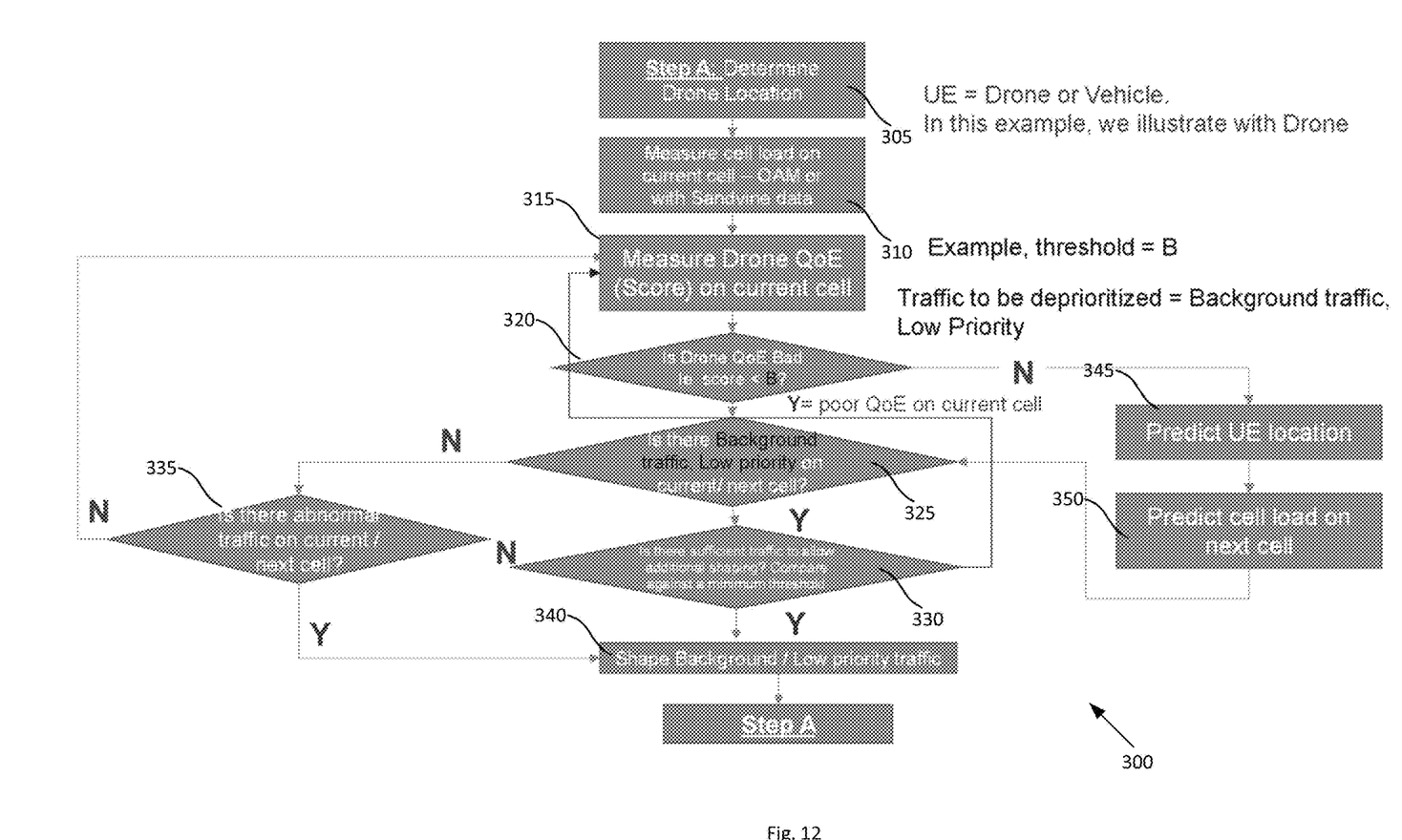
FIG. 12 illustrates a method for delivering quality of services to a drone according to an embodiment.

FIG. 12 illustrates a method 300 for delivering quality of service to a drone. It will be understood that in this example, a drone is used, but other vehicles may have similar methods. The location module 110 determines the location of the drone at 305. The load module 120 may measure the cell load of the current cell for the drone, at 310. The cell congestion may be determined via various methods including, for example, Throughput-RTT correlation.

At 315, the analysis module 130 determines the QoE of the current cell, via for example a QoE score. The analysis module then determines whether the QoE of the current cell is below a predetermined threshold, at 320. It will be understood that the threshold may be configurable and is intended to be at a level that would allow the QoE to receive the appropriate SLA QoS.

If the QoE is below the predetermined threshold, the analysis module may analyze the traffic on the current cell to determine whether there is low priority or background traffic, at 325. At 330, the analysis module may determine whether this shaping the low priority and background traffic is sufficient to provide the level of QoE for the drone. At 335, if this is not sufficient, or if there is not background traffic or low priority traffic on the cell, the analysis module is configured to determine whether there is abnormal traffic that could be shaped on the cell.

At 340, the traffic action module 140 shapes the traffic suggested by the analysis module to provide a desirable QOE for the drone.

If the current cell has adequate QoE, or if the current cell has already been shaped, the system is configured to predict the next location of the drone, at 345 and predict the cell load on the next cell at 350. By reviewing and potentially shaping the background, low priority or abnormal traffic in the next cell of the drone, it is intended that the drone receive a higher level of QoE while the drone travels through various cells. The QoE at the current time is determined as the drone or vehicle moves. Typically, one to three cells ahead are reviewed to decide which cells to shape traffic, although more or fewer cells ahead could be used.

In some cases, the system may receive predictions or statistics related to UE mobility from the NWDAF. The NWDAF may receive data from the SMF and/or AMF or other network device. The NWDAF may then provide the system with a series of locations per UE, which provides a user trajectory. With the user trajectory predicted, the system may determine which cells are within this trajectory for the UE and take targeted actions on these specific cells in advance of the Vehicle driving through the cell. The system may shape background or non-essential traffic first and/or may shape video traffic for the short period the vehicle is within the cell. The small change in QoE to other subscribers is intended to be minimal and for only a short period of time.

Embodiments of the system and method are intended to provide the QoS to the vehicle quickly, as the analysis and traffic actions may be provided with less hops and through less node interaction. Further, unlike conventional solutions, there is no reliance on the PCF to change the Quality Improvement, which may be slower to react.

Further, embodiments of the system and method are intended to stop shaping or performing traffic actions once the vehicle has left the cell. The radio may then resume normal scheduling operations with no long-term changes to the policies effecting the traffic flow.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for delivering quality of service to a moving user equipment in a computer network, the method comprising:
   identifying a moving user equipment on the computer network;
   predicting a path of travel for the user equipment, wherein predicting the path of travel comprises determining a plurality of subsequent cells in the path of travel;
   determining a load of each of the subsequent cells in the path of travel;
   determining a quality of experience measurement for each of the cells based on the load of each cell;
   determining if the quality of experience measurement is above a predetermined quality score;
   determining a traffic action response based on the load and the quality score of each of the subsequent cells; and
   providing the traffic action to any of the subsequent cells wherein the quality score is below the predetermined quality score.

2. The method of claim 1 further comprising:
   determining a change in the path of travel for the user equipment;
   determining a new cell not within the subsequent cells and a load of the new cell in the changed path of travel; and
   providing updated traffic actions based on the load of the new cell.

3. The method of claim 1 wherein the user equipment is a user equipment within a vehicle or a drone.

4. The method of claim 1 wherein determining the load of each of the subsequent cells comprises determining a congestion level of each of the subsequent cells.

5. The method of claim 1 wherein the traffic action comprises shaping background or low priority traffic.

6. The method of claim 1 wherein
   if the score is above the predetermined quality score allowing the traffic to flow from the cell unmodified.

7. The method of claim 1 wherein the plurality of subsequent cells comprises 1 to 3 cells further along the path of travel.

8. The method of claim 1 wherein predicting the path of travel comprises receiving predictions or statistics related to the user equipment mobility from the network data analytics function.

9. A system for delivering quality of service to a moving user equipment in a computer network, the system comprising:
   a location module configured to identify a moving user equipment on the computer network;
   an analysis module configured to predict a path of travel for the user equipment, wherein predicting the path of travel comprises determining a plurality of subsequent cells in the path of travel;
   a load module configured to determine a load of each of the subsequent cells in the path of travel, determine a quality of experience measurement for each of the cells based on the load of each cell, and determining if the quality of experience measurement is above a predetermined quality score; and
   a traffic action module configured to determine a traffic action response based on the load and the quality score of each of the subsequent cells and provide for the traffic action to any of the subsequent cells wherein the quality score is below the predetermined quality score.

10. The system of claim 9 wherein the analysis module is configured to determine
a change in the path of travel for the user equipment and a new cell not within the subsequent cells in the changed path of travel;
the load module is configured to determine a load of the new cell in the changed path of travel; and
the traffic action module is configured to provide updated traffic actions based on the load of the new cell.

11. The system of claim 10 wherein the user equipment is a user equipment within a vehicle or a drone.

12. The system of claim 10 wherein the load module is configured to determine the load of each of the subsequent cells by determining a congestion level of each of the subsequent cells.

13. The system of claim 10 wherein the traffic action module may provide for shaping background or low priority traffic as the traffic action.

14. The system of claim 10 wherein
if the score is above the predetermined quality score the traffic action module allows the traffic to flow from the cell unmodified.

15. The system of claim 9 wherein the plurality of subsequent cells comprises 1 to 3 cells further along the path of travel.

16. The system of claim 9 wherein the location module is configured to predict the path of travel comprises receiving predictions or statistics related to the user equipment mobility from the network data analytics function.

* * * * *